UNITED STATES PATENT OFFICE.

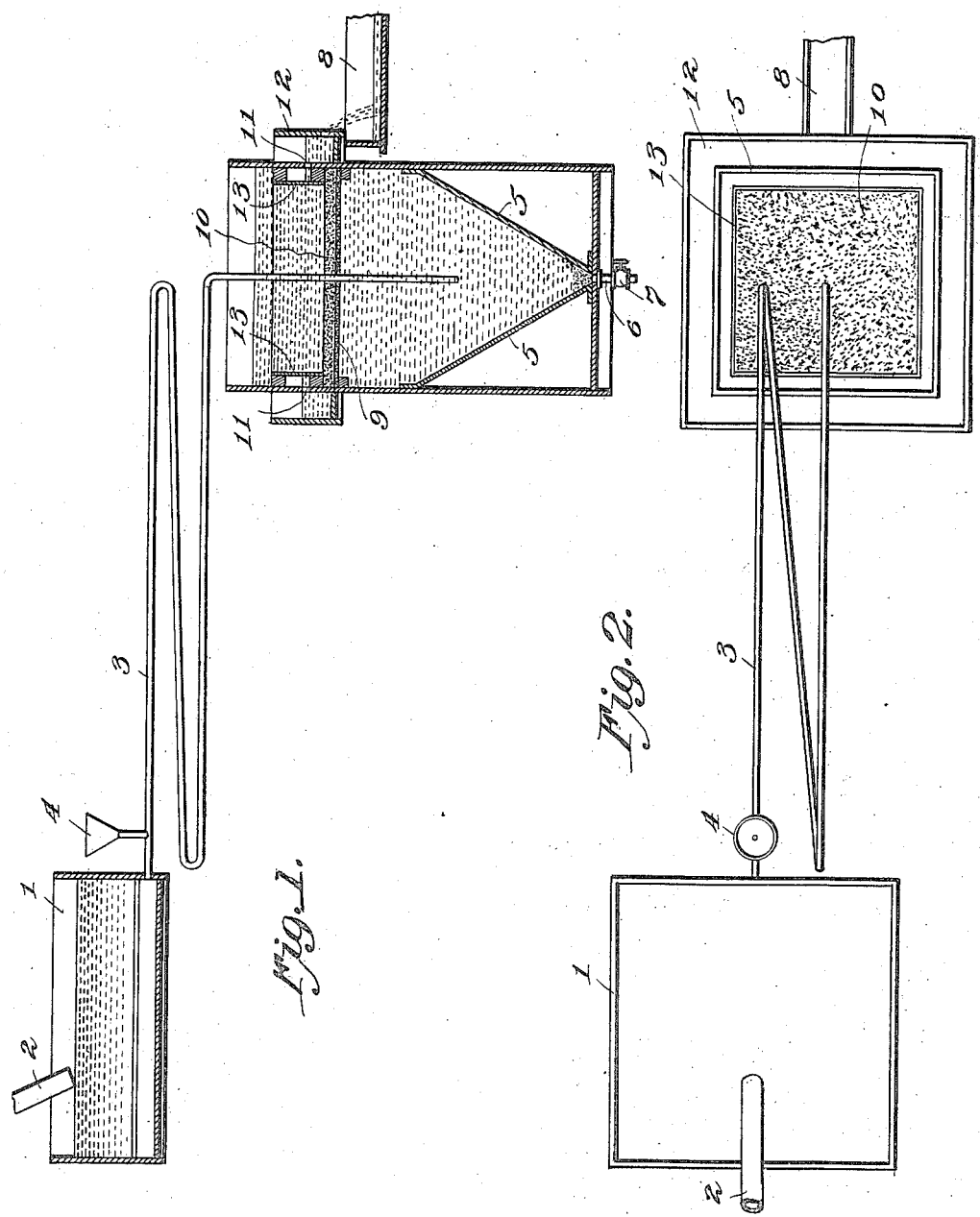

ROBERT S. TOWNE, OF NEW YORK, AND CYRUS ROBINSON, OF MOUNT VERNON, NEW YORK, ASSIGNORS TO METALLURGICAL ENGINEERING & PROCESS CORPORATION, A CORPORATION OF NEW YORK.

PROCESS OF PRECIPITATING AND SEPARATING METALS FROM SOLUTION.

1,156,383.   Specification of Letters Patent.   Patented Oct. 12, 1915.

Application filed September 12, 1912. Serial No. 720,019.

*To all whom it may concern:*

Be it known that we, ROBERT S. TOWNE, a citizen of the United States, residing at New York, in the county and State of New York, and CYRUS ROBINSON, a subject of the King of England, residing at Mount Vernon, in the county of Westchester and State of New York, have invented certain new and useful Improvements in Processes of Precipitating and Separating Metals from Solution, of which the following is a specification, reference being had to the accompanying drawing.

This invention relates to a process for precipitating metals from solutions. For purposes of illustration we will in the following specification refer to the precipitation of gold or silver from cyanid solutions by means of zinc as a precipitant. However, we desire it to be understood that our invention is not so limited but may under the proper conditions be used to effect the precipitation of gold and silver or other metals from other solutions, as for instance, a solution of sodium hyposulfite by means of other precipitants, as for instance, copper.

The principal object of our invention is to provide a process by means of which the precipitant may be economically used in powdered or finely divided form.

Further objects will be apparent from the following specification.

In the accompanying drawings we have shown, more or less diagrammatically, one form of apparatus which may be used in the practice of our improved process, but we desire it to be understood that our invention is not limited to use in connection with the particular apparatus illustrated but may be practised in connection with any apparatus which is suitable.

Of the drawings—Figure 1 is a side elevation, partly in cross section. Fig. 2 is a plan view.

Referring to the drawings, 1 represents a reservoir or clarifier to which, through the pipe or trough 2, can be supplied the cyanid or other solution carrying the dissolved gold, silver, or other metals to be recovered. This reservoir or clarifier 1 is preferably sufficiently large to permit the removal from the solution by sedimentation of any impurities which may be suspended in it.

Leading from the reservoir or clarifier 1 is a conduit 3 which preferably has a considerable length. The exact length in any particular case may be determined from a consideration of the kind of solution, the quantity of values to be recovered and other conditions of use. In order to obtain the necessary length in a given space it may frequently be desirable to arrange the conduit in zigzag manner, as indicated. The conduit 3 is preferably a closed pipe as shown in the drawings, but under certain conditions it may be possible to use an open trough.

At 4 we have indicated a device for feeding to the solution in the conduit 3 regulated quantities of precipitant. If a cyanid solution is being treated the precipitant is preferably zinc in powdered or finely divided form. The device 4 shown in the drawing is simply a funnel communicating at its lower end with the conduit; but it will be understood that other feeding devices such as are now well known may be used.

In practice, the solution flows in a steady stream through the conduit 3 and the precipitant is steadily supplied to the stream from the feeder 4. The movement of the solution and the precipitant through the conduit serves to commingle and agitate them with the result that at the end of the conduit all of the dissolved values have been precipitated and are being carried along in suspension.

The conduit 3 communicates at its end with the lower part of a settling tank or receptacle 5, which is preferably provided with an inverted conical or pyramidal bottom at the apex of which there is connected a pipe 6 having a valve 7. As the solution with the suspended values enters the receptacle 5 and comes substantially to rest, the values separate out by gravity and fall to the bottom where they can be removed through the pipe 6 and the valve 7 either continuously or periodically. The solution freed from the precipitated values moves slowly upward through the receptacle and is finally discharged into the trough or launder 8 through which it can be led to be used again.

We have found that when there is unobstructed communication between the lower and upper parts of the receptacle and when the solution is permitted to flow freely from the upper part there is a decided tendency for a part of the more finely divided values to be carried upward and out with the solution. The upward moving solution tends to carry some of the values, but a much greater factor is the gas which is formed at the bottom of the receptacle probably by galvanic action between the zinc and the silver. This gas passes rapidly upward through the receptacle and carries with it large quantities of the precipitate, the result being that the precipitate thus carried upward is left in suspension near the top of the receptacle where it can easily pass outward with the solution. In order to avoid this difficulty we provide at 9 a screen or grate which extends entirely across the receptacle, and upon this screen or grate as a support we place a layer of zinc 10 in relatively finely divided form. The screen and the layer of zinc have two functions. One is to mechanically free the metallic values from the upward moving gas, and the other is to prevent the escape of any of the values in solution in case they may have been re-dissolved during the movement upward through the receptacle 5.

Around the upper part of the receptacle there are provided a series of openings 11, 11, which communicate at their outer ends with a trough 12 which extends around the receptacle and discharges into the trough 8. Preferably we provide in front of the openings 11, 11 a filtering medium 13 which may if desired be formed of canvas. Through this filtering medium all of the liquid must pass before it can escape from the receptacle, and the medium therefore serves to catch any values which may have escaped the action of the screen 9 and the zinc layer 10.

From the foregoing description it will be seen that our process involves the movement of the precipitated values in a general downward direction from the end of the conduit 3 and the movement of the solution in a general upward direction from the end of the conduit. This prompt and rapid separation of the values from the solution is of the utmost importance. In all earlier processes in which use was made of finely divided metallic precipitants the effort has been made to separate the precipitated values from the solution by means of a filter press or other device in which the values and the solution are carried along together in the same direction, the separation being effected merely by mechanically retarding the movement of the values with respect to that of the solution. But these earlier processes have all been open to the very serious objection that there was a strong tendency for the values to be re-dissolved by the solution during the period of separation. It has heretofore been commonly practised to use a quantity of zinc or other metallic precipitant far in excess of that theoretically necessary for precipitation in order to insure the presence in the filter or other separating device of an excess of zinc or other precipitant to prevent the re-dissolving of the values. In fact, in many cases it has been found necessary to use as much as eight times the amount of zinc which would theoretically be necessary, and this has been found to be prohibitively expensive. With our process, by quickly separating the values from the solution we are able to very materially reduce the quantity of precipitant which it is necessary to initially use. The relatively large body of precipitant at 10 serves to prevent the escape of any values in the case of their becoming dissolved in the solution within the receptacle.

We provide for a continuous stream of solution flowing along the prolonged unbroken pathway provided by the pipe 3 and discharging directly and without the breaking of its continuity into the fluid body in the tank 1. Preferably, the stream flowing through the pipe 3 originates in an initial relatively large solution body, such as that contained in the tank 1. There is, therefore, a continuity of solution fluid from the initial end of the pipe 3, and preferably from the solution in the tank 1, to the liquid in the tank 5. The stream through the pipe 3 never loses its velocity until the tank 5 is reached and the agitating and mixing of the precipitant is continuously carried on. Furthermore, there is no opportunity for any of the precipitates to be deposited along the pipe, as the continued flow of liquid keeps them in suspension.

What we claim is:

1. The herein described process of precipitating and separating dissolved values from a solution, which consists in causing a continuous stream of the solution to flow along a prolonged unbroken pathway, mingling with the stream of solution while thus flowing a precipitant in finely divided form to effect mixing, agitating, dissolving and precipitating, forming a stationary liquid body of approximately predetermined volume relatively elongated vertically and having at its bottom a relatively large region of quiescence and at its top a relatively large region for dissolving and precipitating, causing the aforesaid stream while maintaining its continuity to flow into the said fluid body at an intermediate level above the said region of quiescence and below the said region of dissolving and precipitating, causing the precipitated values to settle by gravity downward through the liquid body, removing the said values at the lower part of the liquid body, causing the solution liquid to pass upward through the liquid body away from the points of feeding to effect continued dissolving and precipitating, and discharging the solution liquid at the top of the said liquid body.

2. The herein described process of precipitating and separating dissolved values from a solution, which consists in causing a continuous stream of the solution of uniform cross area throughout to flow along a prolonged unbroken inclosed pathway, mingling with the stream of solution while thus flowing a precipitant in finely divided form to effect mixing, agitating, dissolving and precipitating, forming a stationary liquid body of approximately predetermined volume relatively elongated vertically and having at its bottom a relatively large region of quiescence and at its top a relatively large region for dissolving and precipitating, causing the aforesaid stream while maintaining its continuity to flow into the said fluid body at an intermediate level above the said region of quiescence and below the said region of dissolving and precipitating, causing the precipitated values to settle by gravity downward through the liquid body, removing the said values at the lower part of the liquid body, causing the solution liquid to pass upward through the liquid body away from the points of feeding to effect continued dissolving and precipitating, and discharging the solution liquid at the top of the said liquid body.

3. The herein described process of precipitating and separating dissolved values from a solution, which consists in forming a relatively large body of the solution, causing a continuous stream of the solution to flow from the said body along a prolonged unbroken pathway, mingling with the stream of solution while thus flowing a precipitant in finely divided form to effect mixing, agitating, dissolving and precipitating, forming a stationary liquid body of approximately predetermined volume relatively elongated vertically and having at its bottom a relatively large region for dissolving and precipitating, causing the aforesaid stream while maintaining its continuity to flow into the said fluid body at an intermediate level above the said region of quiescence and below the said region of dissolving and precipitating, causing the precipitated values to settle by gravity downward through the liquid body, removing the said values at the lower part of the liquid body, causing the solution liquid to pass upward through the liquid body away from the points of feeding to effect continued dissolving and precipitating, and discharging the solution liquid at the top of the said liquid body.

4. The herein-described process of separating dissolved values from a solution containing a precipitant, it consisting in forming a relatively stationary vertically elongated body of approximately predetermined volume of said fluid, supplying a stream of the fluid to the said relatively stationary volume at a point above the bottom to provide a relatively large region of quiescence at the bottom, and at the top a region for the final escape of the fluid, causing the values after precipitating to settle by gravity downward through the said body of liquid and removing them from the quiescent lower part thereof, causing the solution fluid to pass upward away from the points of feeding to elevated planes of discharge, and subjecting the solution to a filtering action at points adjacent the points of discharge and uniformly distributed horizontally over the entire cross area of the body of liquid.

5. The herein described process of precipitating and separating dissolved values from a solution, which consists in mingling with the solution a precipitant in finely divided form to effect precipitation, causing the solution and precipitant to flow along an extended pathway to permit prolonged mixing, agitating, dissolving and precipitating, forming of the fluid a stationary body of approximately predetermined volume relatively elongated vertically, and having at the bottom a relatively large region of quiescence, and at the top region for the continuance of the dissolving and precipitating action, supplying a stream of the fluid with the aforesaid contents to the aforesaid relatively stationary volume, causing the precipitated values to settle by gravity downward through the body of liquid, removing the said values at the lower part of the liquid body, causing the solution fluid to pass upward away from the points of feeding to a point of discharge, and subjecting the solution fluid to the action of a body of precipitant before it reaches the said point of discharge.

6. The herein-described process of separating dissolved values from a solution containing a precipitant, it consisting in forming a relatively stationary vertically elongated body of approximately predetermined volume of said fluid, supplying a stream of the fluid to the said relatively stationary volume at a point above the bottom to provide a relatively large region of quiescence at the bottom, and at the top a region for the final escape of the fluid, causing the values after precipitating to settle by gravity downward through the said body of liquid and removing them from the quiescent lower part thereof, causing the solution fluid to pass upward away from the points of feeding to elevated planes of discharge, subjecting the solution to the action of a body of precipitant before it reaches the points of discharge, and subjecting the solution to a filtering action at points adjacent the said points of discharge.

In testimony whereof we affix out signatures, in presence of two witnesses.

ROBERT S. TOWNE.
CYRUS ROBINSON.

Witnesses:
FRED M. HILLIARD,
W. A. GILLESBY.